US006801188B2

(12) United States Patent
Longobardi

(10) Patent No.: US 6,801,188 B2
(45) Date of Patent: Oct. 5, 2004

(54) FACILITATED USER INTERFACE

(75) Inventor: Giuseppe Longobardi, Castellammare Di Stabia (IT)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 09/918,954

(22) Filed: Jul. 31, 2001

(65) Prior Publication Data

US 2002/0109731 A1 Aug. 15, 2002

(30) Foreign Application Priority Data

Feb. 10, 2001 (GB) ................................................ 0103349

(51) Int. Cl.[7] ................................................. G09G 5/00
(52) U.S. Cl. ..................... 345/156; 340/825.19; 341/21
(58) Field of Search ................................ 345/156, 157, 345/158, 7, 8, 1.1, 1.3, 2.2, 3.1, 865; 340/825.19; 341/21

(56) References Cited

U.S. PATENT DOCUMENTS

| 4,746,913 A | * | 5/1988 | Volta ........................... 345/184 |
| 5,287,119 A | * | 2/1994 | Drumm ....................... 345/158 |
| 5,367,315 A | * | 11/1994 | Pan ............................. 345/156 |
| 5,831,597 A | * | 11/1998 | West et al. .................. 345/163 |
| 5,838,307 A | * | 11/1998 | Bouton ........................ 345/168 |
| 6,445,364 B2 | * | 9/2002 | Zwern ............................ 345/8 |
| 6,642,909 B1 | * | 11/2003 | Oliva ........................... 345/1.3 |

* cited by examiner

Primary Examiner—Alexander Eisen
(74) Attorney, Agent, or Firm—Volel Emile; Leslie A. Van Leeuwen

(57) ABSTRACT

A facilitated input unit (165,170), particularly for allowing a disabled person to use a computer (100). The input unit includes a small display (165) for showing available input items (such as characters, number, and control keys), which is distinct from a monitor (145) of the computer; a headset (170), or other equivalent means, is used to select one of the items and enter the selected item into the system without using the user's hands, thereby simulating a keyboard (155) of the computer.

13 Claims, 6 Drawing Sheets

US 6,801,188 B2

FACILITATED USER INTERFACE

FIELD OF INVENTION

The present invention relates to a facilitated input unit.

BACKGROUND OF THE INVENTION

Several types of facilitated input units have been developed in the recent years, for example for allowing persons with certain physical disabilities in their motor functions to use a PC (Personal Computer). These input units do not require use of the hands, and typically control interactions with the computer by tracking a user's head and/or eye movement, as described for example in U.S. Pat. Nos. 4,682,159, 5,323,174 and 5,367,315.

A solution known in the art, particularly useful for entering input data by persons also possessing a speech difficulty or disability, is disclosed in U.S. Pat. No. 5,068,645 and consists of showing on a monitor of the computer a keyboard layout. The user moves a cursor to a desired key by slight head rotations; the user then speaks a short command sound to input a character associated with the chosen key into the computer.

A drawback of the solution described above is that it requires modifications of an existing software controlling operation of the computer; particularly, an operating system must be customised in order to show the keyboard layout (for example in a dedicated window) and to accept the input characters chosen by the user's head movement.

Moreover, the window used to show the keyboard layout is always open and involves wastage of working space on the monitor; this reduces the amount of information that can be shown simultaneously to the user by active application programs running on the computer.

It is an object of the present invention to overcome the above-mentioned drawbacks. In order to achieve this object, a facilitated input unit as set out in the first claim is proposed.

DISCLOSURE OF THE INVENTION

Briefly, the present invention provides a facilitated input unit for interacting with a system having a first display for showing information to a user, the input unit including means for showing available input items and means for selecting one of the items and entering the selected item into the system without using the user's hands, wherein the means for showing includes a second display distinct from the first display.

Moreover, the present invention also provides a computer including this input unit, and a corresponding method of interacting with a system.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
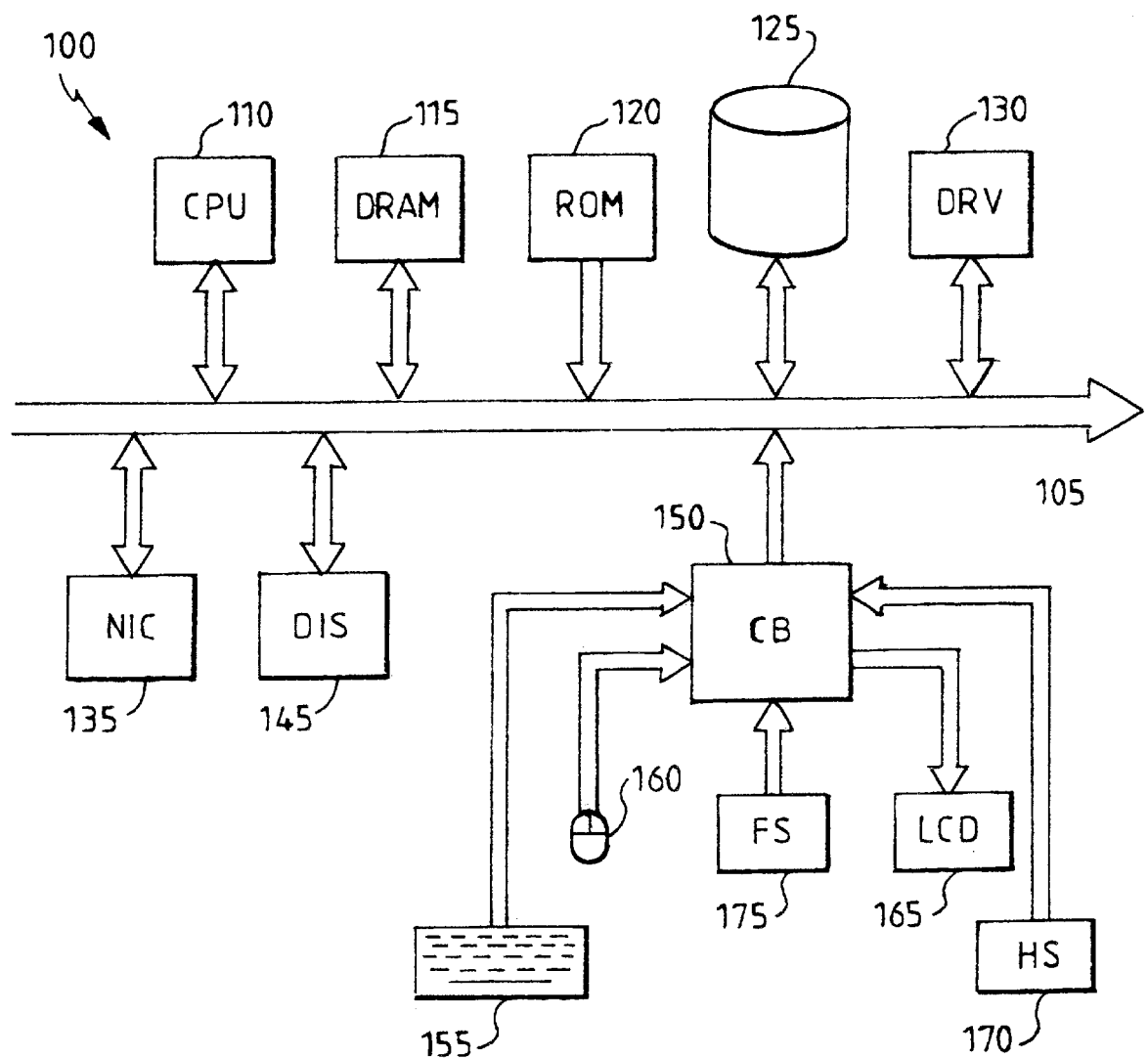
FIG. 1 shows a schematic block-diagram of a computer in which the input unit of the invention can be used.

With reference in particular to FIG. 1, there is shown a computer 100, for example a PC (Personal Computer). The computer 100 has several units, which are connected in parallel to a communication bus 105. In particular, a central processing unit (CPU) 110 controls operation of the computer 100, a working memory 115 (typically a DRAM) is used directly by the CPU 110, and a read-only memory (ROM) 120 stores a basic program for starting the computer 100. Various peripheral units are further connected to the bus 105 (by means of respective interfaces). More specifically, a bulk memory consists of a hard disk 125 and of a driver unit (DRV) 130 for reading/writing floppy disks and/or CD-ROMs. A network interface card (NIC) 135 is used to connect the computer 100 to a network (typically the INTERNET).

An output unit consists of a monitor, or display screen, (DIS) 145. A control box (CB) 150 has two inputs for a keyboard (KB) 155 and a mouse (MS) 160, respectively. The control box 150 also drives an LCD display (Liquid Crystal Display) 165. A headset (HS) 170 and a foot-switch (FS) 175 are connected to respective further inputs of the control box 150.

Likewise considerations apply if the computer includes different units (such as a printer, a scanner or a web-cam), if the computer has a different structure (for example with a multi-processor architecture), and so on.

Figure 2:
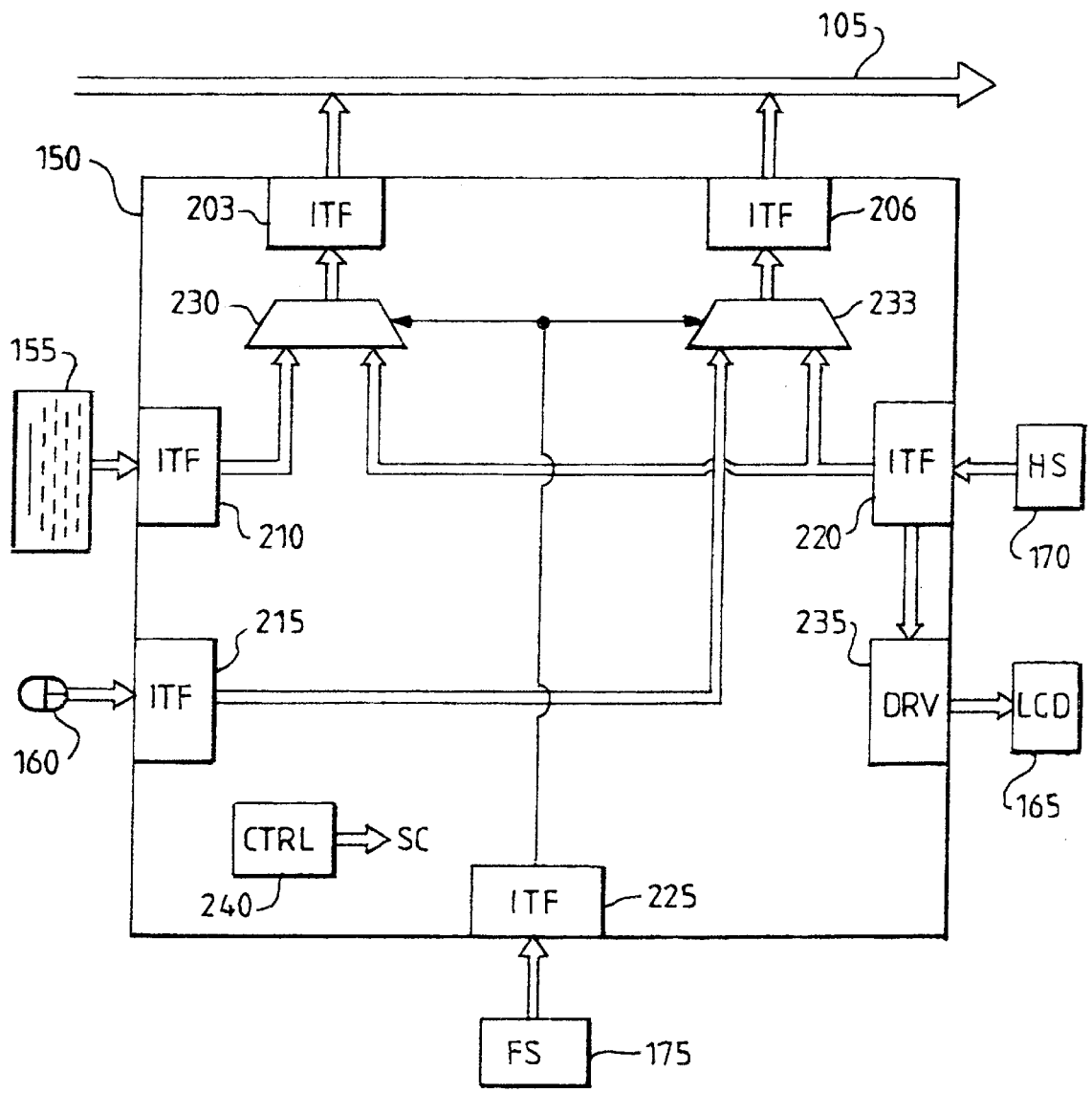
FIG. 2 is a diagrammatical representation of a control box of the input unit.

Considering now FIG. 2, the control box 150 includes two interface units (ITF) 203 and 206 for accessing the bus 105; particularly, the interface unit 203 is connected to a standard keyboard port of the computer, while the interface unit 206 is connected to a standard mouse port. Further interface units 210, 215, 220 and 225 are used to connect the keyboard 155, the mouse 160, the headset 170 and the foot-switch 175, respectively, to the control box 150.

The interface unit 210 (associated with the keyboard 155) and the interface unit 215 (associated with the mouse 160) are connected to a first input of a multiplexer 230 and of a multiplexer 233, respectively; the interface unit 220 (associated with the headset 170) is connected to a second input of both the multiplexers 230 and 233. The multiplexers 230 and 233 selectively transfer the signals at their first input or at their second input to the interface units 203 and 206, respectively, according to a control signal provided by the interface unit 225 (associated with the foot-switch 175). The interface unit 220 also controls a driver unit (DRV) 235 for the display 165.

Operation of the box 150 is managed by a control unit (CTRL) 240; the control unit 240 outputs various control signals that are denoted as a whole with Sc.

Figure 3:
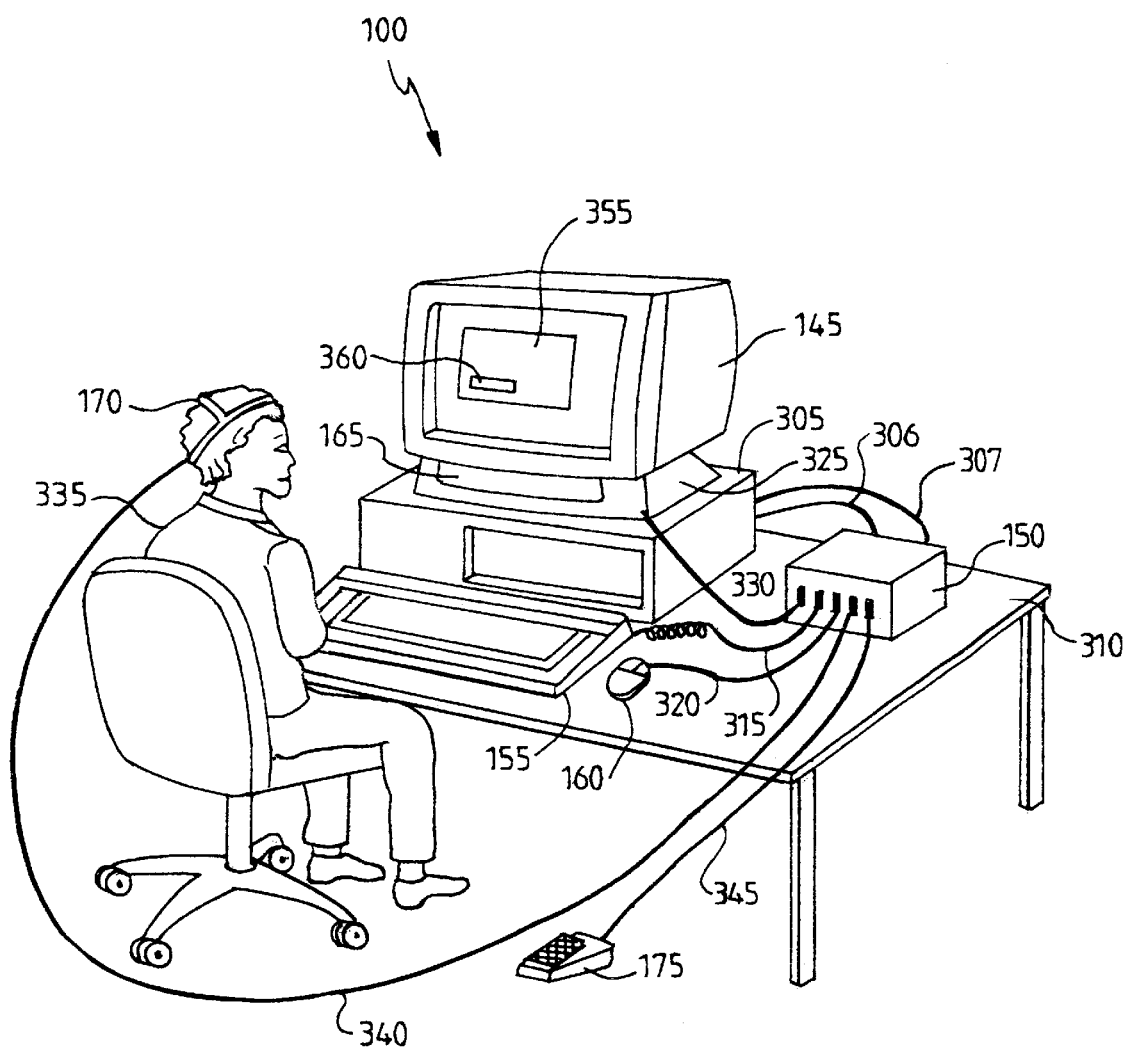
FIG. 3 is a pictorial representation of the computer.

As shown in FIG. 3, the monitor 145 is arranged on a central unit 305 of the computer (enclosing the system bus and the units directly connected thereto), which in turn rests on a desktop 310; the monitor 145 is connected to the central unit 305 by means of a cable not shown in the figure). The control box 150 is positioned on the desktop 310, close to the central unit 305. Two cables 306 and 307 are used to connect the control box 150 to the keyboard port and to the mouse port, respectively.

The keyboard 155 and the mouse 160 are arranged on the desktop 310, in front of the central unit 305; the keyboard 155 and the mouse 160 are provided with a cable 315 and 320, respectively, which is plugged into a connector associated with the corresponding interface unit of the control box 150. The display 165 is embedded in a support element 325, which replaces a standard base of the monitor 145. A further cable 330 connects the display 165 to the respective driver unit of the control box 150.

A user 335 seats in front of the monitor 145 and the display 165. The user 335 wears the headset 170, which is placed around his head. The headset 170 incorporates two mercury micro-switches providing both lateral and vertical head tracking; particularly, the headset 170 detects rotational movements of the user's head, and outputs a digital signal for each direction (lateral/vertical) and for each sense (to the left/right or upwards/downwards), which is asserted when the respective angle of tilt of the user's head exceeds a threshold value (for example 30°). The foot-switch 175 rests on a floor, close to the user 335. The headset 170 and the foot-switch 175 are provided with a cable 340 and 345, respectively, which is plugged into a connector associated with the corresponding interface unit of the control box 150.

Programs running on the computer 100 often interact with the user 335 requiring the entering of input data. For example, the monitor 145 simulates a working area (desktop) including a dialog box 355; the dialog box 355 prompts the user 335 to insert some text into a respective fill-in field 360. Normally, the user selects the fill-in field 360 moving a cursor with the mouse 160, and then types the text to be entered using the keyboard 155. Conversely, a physically disabled user will perform the same operations by using a hands-free, facilitated input unit formed by the display 165 and the headset 170 (as described in detail in the following), which simulates the keyboard 155 and the mouse 160.

Figure 4A:
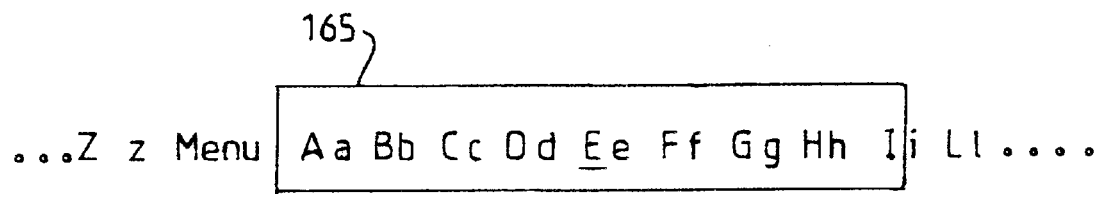
FIGS. 4a–4c show different examples of the content of a display included in the input unit.

With reference now to FIG. 4a, the display 165 consists of an elongated element arranged horizontally. The display 165 is used to show available input items consisting of symbols (such as alphanumeric characters, special characters, and control keys as TAB, END, CANC, PAGEUP, PAGEDONW, F1–F12) and a main menu identifier; the items are arranged in a wrap-around sequence, which is scrollable horizontally. A subset of the items (consisting of seventeen items in the example at issue) is simultaneously shown as an array on the display 165; a current position along the subset(character E) is underscored.

Figure 4B:
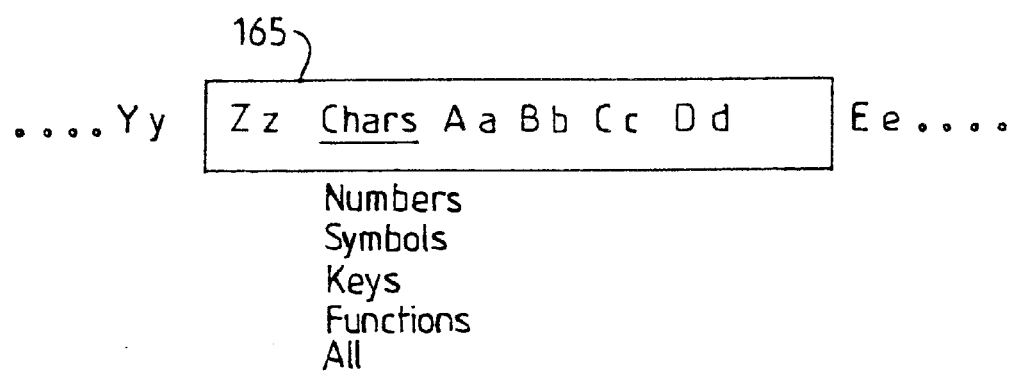
Figure 4C:
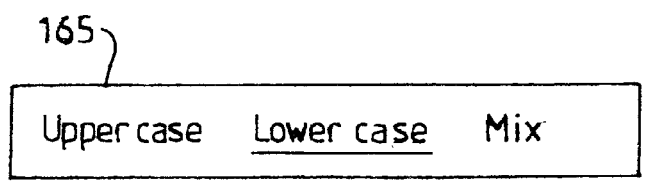

As shown in FIG. 4b, the main menu includes a series of options; the menu options are arranged in a first-level list, which is scrollable vertically. The menu options consist of commands or cascading menu identifiers. Each cascading menu (such as the one denoted with "Chars" in the figure) includes a further series of commands; as shown in FIG. 4c, the commands are arranged in a second-level list, which is scrollable horizontally. Preferably, the menu options of the first-level list are used to define the input symbols, for example only alphanumeric characters (with a corresponding cascading menu for selecting only the upper case, only the lower case or both of them), only numbers, only special characters, only control keys, or all of them. Moreover, a cascading menu is used to select mouse functions, such as moving upwards/downwards or to the left/right of a position segment ('mickey'), and clicking on the left, central or right button.

Similar considerations apply if the control box is replaced by another equivalent device, if some of its operations are implemented by software, if the display is of a different type (for example a LED display) or has a different shape, if a different threshold value for the user's head angle of tilt is employed, if the programs running on the computer have a different user interface, if the current position is denoted in a different manner (for example with a blinking), and the like.

Figure 5A:
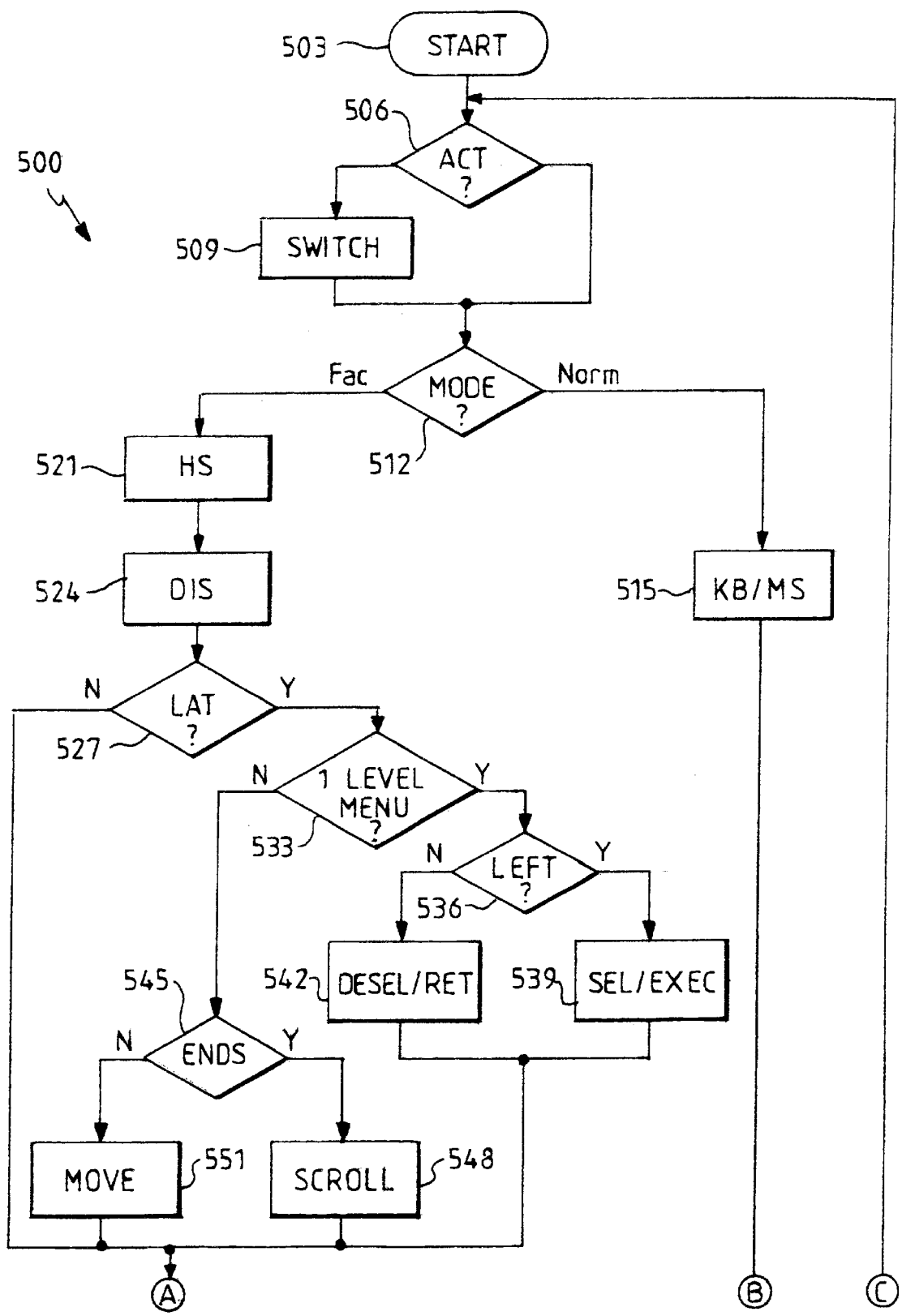
FIGS. 5a–5b are a flow chart of a method used for controlling the input unit.
Figure 5B:
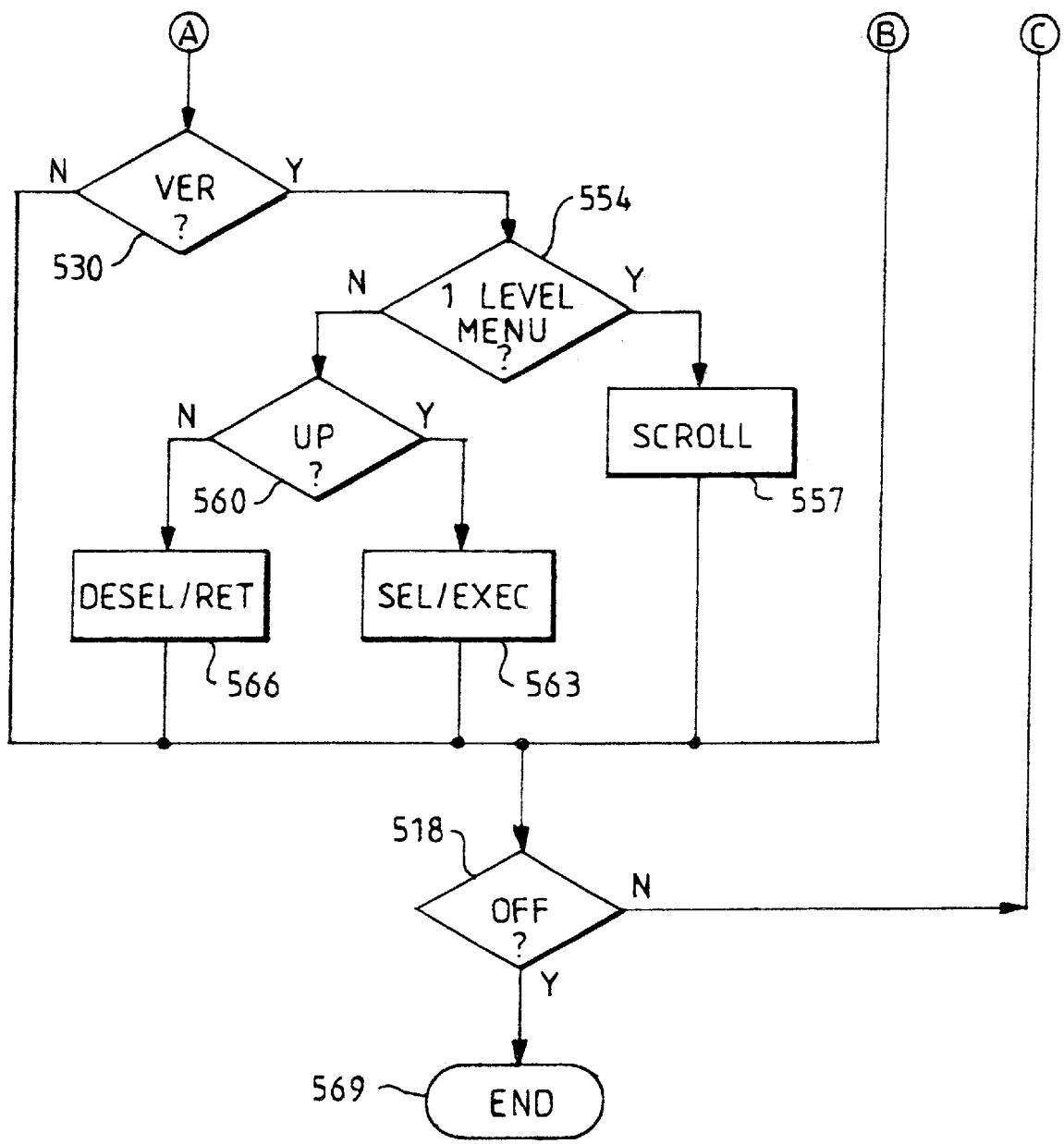

Considering now FIGS. 5a–5b, when the computer is switched on a driver module managing operation of the control box runs a method 500 which starts at block 503 and then goes to block 506, wherein it checks whether the foot-switch has been actuated. If so, a mode of operation of the control box is switched at block 509 between a normal mode and a facilitated mode (set as a default at the beginning); the method then passes to block 512. Conversely, the method continues to block 512 directly The method verifies at block 512 the mode of operation of the control box. If the control box is set to operate in the normal mode, the method proceeds to block 515, wherein the interface unit of the headset and the driver unit of the display are disabled; at the same time, the multiplexers are controlled to transfer the input data received from the interface units associated with the keyboard and the mouse, respectively. In this way, the user moves the cursor with the mouse and types input data with the keyboard as usual (being the control box completely transparent to the computer). The method then descends into block 518 (described in the following).

On the contrary, if the control box is set to operate in the facilitated mode (block 512), the method goes to block 521, wherein the interface units of the keyboard and the mouse are disabled, and both the multiplexers are controlled to transfer the input data received from the interface unit associated with the headset. Passing to block 524, a subset of the input items is shown on the display; at the beginning, the subset consists of the first seventeen alphanumeric characters (uppercase and lowercase), and the current position is set to the one associated with the central character of the subset.

A verification is then made at block 527 whether the user's head has been moved laterally (that is whether one of the corresponding signals provided by the headset is asserted). If not, the method continues to block 530 (described in the following). Conversely, the method checks at block 533 the item associated with the current position. If the current position is associated with a menu option of the first level list, the method goes to block 536. A verification is made at block 536 on the sense of the detected movement of the user's head. If the user's head has been rotated to the left the method descends into block 539, wherein the menu option is selected and highlighted on the display (if non-selected) or the corresponding operation is executed (if the menu option is already selected); particularly, when the option is the identifier of a cascading menu, the respective second-level list is opened and shown on the display. Conversely, if the user's head has been rotated to the right the method descends into block 542, wherein the menu option is deselected (if selected) or the first level list is closed returning to the main menu identifier (if the menu option is not selected). In both cases, the method then passes to block 530.

Referring back to block 533, if the current position is associated with an input symbol, the main menu identifier or a command of the second level list, the method proceeds to block 545; a verification is made at block 545 whether the current position has reached any end of the array (that is a first or a last position). If the current position has reached an end of the array, the method continues to block 548, wherein the items are caused to scroll horizontally (in a wrap-around manner) according to the sense of the detected movement of the user's head (to the left or to the right); in this way, a new item appears on the display, with the other items moving of one position (so that one item disappears). Preferably, if all the menu options available in the current second level list fit into the display, the scrolling is disabled. Conversely, if the current position has not reached any end of the array (block 545), the method proceeds to block 551, wherein the current position is moved of one item to the left or to the right according to the sense of the detected movement of the user's head. In both cases, the method then goes to block 530.

A verification is then made at block 530 whether the user's head has been moved vertically. If not, the method descends into block 518 directly. Conversely, the method checks at block 554 the item associated with the current position. If the current position is associated with a menu option of the first level list, the method goes to block 557, wherein the menu options are caused to scroll vertically (in a wrap-around manner) according to the sense of the detected movement of the user's head (upwards or downwards); in this way, a new menu option appears on the display, replacing the one currently shown. The method then passes to block 518.

On the contrary, if the current position is associated with an input symbol, the main menu identifier or a command of the second level list (block 554), the method proceeds to block 560; a verification is made at block 560 on the sense of the detected movement of the user's head. If the user's head has been rotated upwards, the method goes to block 563, wherein the item is selected and highlighted on the display (if non-selected) or the corresponding operation is executed (if the item is already selected). Particularly, when the item is an input symbol this is entered into the computer (simulating a hit of a corresponding key on the keyboard), when the item is the main menu identifier the first level list is opened and its first option is shown on the display, and when the item is a command of the second level list the corresponding operation is executed. Conversely, if the user's head has been rotated downwards the method descends into block 542, wherein the item is deselected (if selected) or the second level list is closed returning to the respective identifier (if the menu command is not selected). The method then descends into block 518.

The method checks at block 518 if the computer has been shut down. If not, the method returns to block 506 (for repeating the steps described above). On the contrary, the method ends at the final block 569.

Likewise considerations apply if the driver module controlling the box implements an equivalent method, for example with the input symbols selected/deselected with the upwards movement and entered into the computer with the downwards movement, with error signals, and so on.

More generally, the present invention provides a facilitated input unit for interacting with a system having a first display for showing information to a user; the input unit includes a second display (distinct from the first display) for showing available input items and means for selecting one of the items and entering the selected item into the system without using the user's hands.

The solution of the invention makes it possible to communicate with the system, and particularly with an operating system of the computer, in the same manner as a conventional keyboard and mouse. Therefore, the computer may be used with all presently available software applications, without requiring any customisation.

Moreover, the showing of the items does not involve any wastage of working space on the monitor, so that the whole desktop is available for use by other programs as usual.

The preferred embodiment of the present invention described above offers further advantages. Particularly, the display only shows a scrollable subset of the items simultaneously. This makes the display and the controlling hardware/software very simple and inexpensive. The arrangement of the items in a wrap-around sequence further facilitates the use of the input unit.

Likewise considerations apply if the display is arranged vertically, if the items are scrollable only in a single sense, if a whole line is scrollable at a time. Alternatively, the input unit does not feature any scrolling (for example with the display showing a keyboard layout), or the items are arranged in a non-wrap-around sequence.

The use of a single array of items provides a very compact structure, which is particularly easy to use (even by persons with a non perfect control of their head movement). Advantageously, the input unit tracks the user's head movement; the detected movements along a first direction (such as laterally) control scrolling of the items on the display, while the detected movements along a second direction (such as vertically) control selecting/deselecting and entering of the items. This feature is particularly advantageous when the user is non properly speaking, or completely dumb. Moreover, the menu options allow the user to change the input items shown on the display according to a specific application (for example only alphanumeric characters when using a word processor or only numbers when using a spread-sheet).

Similar considerations apply if scrolling and/or selecting of the items is controlled by different movements of the user's head (for example forward and backward), if the movement of the user's head is detected by different sensors (for example ultrasonic or light transceivers), if the sensors are embedded in a frame for glasses, if an absolute value of an orientation of the user's head is detected, if the menu options are organised in a different manner (for example with two or more menus or with a different number of levels, down to a single level menu), if the input items are defined by using corresponding foot-switches, and the like.

Alternatively, the input unit is driven by the user's eye movement, which is detected by reflection of light from the eyes (with a more complex structure, but which does not require the user to wear any special hardware), by a set of foot-switches (with a more effective structure, but which cannot be used by a completely paralysed person), or by a movement of any other portion of the user's body. However, the solution of the present invention leads itself to be carried out even with two or more lines of items shown simultaneously on the display, with a display accommodating a single item at a time, with selection of the items driven by a voice detector, or without any menu for defining the items.

The control box simulates operation of a standard keyboard and mouse, irrespective of the origin of the input data. This allows the input unit of the invention to be used without any modification of existing hardware, and without the need to plug/unplug devices for the normal and facilitated usage.

Likewise considerations apply if the control box has a different structure, if the various connections with the central unit of the computer are of a wireless type, if the foot-switch is replaced by a different actuating switch (for example in the support base embedding the display), and so on; however, the solution of the present invention leads itself to be implemented even replacing the control box with a corresponding board plugged into a slot of the bus, or with dedicated ports of the computer for the headset and the display.

Advantageously, the input unit of the invention is used for entering data into a computer, particularly by persons that are not able to use their hands to control the keyboard and the mouse. This involves a real way to interact with the computer directly, for example allowing disabled persons to travel virtually using the INTERNET. Preferably, the display is embedded in a support element of the monitor, so that the set-up of the input unit simply involves replacing the standard base of the monitor with this support element.

Alternatively, the input unit according to the present invention is used in a different application (such as for controlling a set-top box or a TV set), or the display is arranged elsewhere (for example resting on the monitor).

Naturally, in order to satisfy local and specific requirements, a person skilled in the art may apply to the solution described above many modifications and alterations all of which, however, are included within the scope of protection of the invention as defined by the following claims.

What is claimed is:

1. A facilitated input unit for interacting with a system, the system having a first display for showing information to a user, the input unit including:

a second display distinct from the first display for showing available input items wherein a subset of the items are simultaneously shown on the second display, the subset consisting of a plurality of items arranged in an array having a first and a second end;

means for scrolling the items on the second display;

means for providing an indication of an active position along the subset, wherein the means for scrolling includes means for detecting a movement of a portion of the user's body along a first direction, the active position moving along the subset in response to the detected movement along the first direction and the items scrolling on the second display after the active position reaches the first or the second end of the array; and means for selecting one of the items and entering the selected items into the system without using the user's hands wherein the means for selecting includes means for detect in a movement of the portion of the user's body along a second direction, the item corresponding to the active position being selected/deselected and entered into the systems in response to the detected movement along the second direction.

2. The input unit according to claim 1, wherein the items are ordered in a sequence, the means for scrolling causing the items to wrap around the sequence.

3. The input unit according to any claim from 1, further including means for selectively defining the available input units.

4. The input unit according to claim 1, further including a control device having an input for connection to the means for selecting, at least one further input for connection to a hand-driven further input unit of the system, an output for connection to the second display, at least one further output for connection to the system, and means for selectively transferring input data from the input unit or from the further input unit to the system.

5. A facilitated input unit for interacting with a system, the system having a system display for displaying information, the facilitated input unit comprising:

an input display for displaying available items to a user, the input display being distinct from the system display;

means for detecting a movement of a portion of the user's body along a first direction, the available items moving across the input display in response to the detected movement along the first direction;

means for detecting a movement of the portion of the user's body along a second direction; and means for selecting one of the displayed items based on the movement of the user's body along the second direction.

6. The facilitated input unit according to claim 5 wherein the selecting means includes means for indicating an active position on the input display, the active position being the position of the selected item.

7. The facilitated input unit according to claim 6 further including means for moving the active position from a first end to a second end of the input display.

8. A computer program product on a computer readable medium for enabling a facilitated input unit to interact with a system, the system having a system display for displaying information, the computer program product comprising:

code means for displaying available items to a user on an input display, the input display being distinct from the system display;

code means for detecting a movement of a portion of the user's body along a first direction, the available items moving across the input display in response to the detected movement along the first direction;

code means for detecting a movement of the portion of the user's body along a second direction; and code means for selecting one of the displayed items based on the movement of the user's body along the second direction.

9. The computer program product according to claim 8 wherein the selecting code means includes code means for indicating an active position on the input display, the active position being the position of the selected item.

10. The computer program product according to claim 9 further including code means for moving the active position from a first end to a second end off the input display.

11. A method of enabling a facilitated input unit to interact with a system, the system having a system display for displaying information, the method comprising the steps of:

displaying available items to a user on an input display, the input display being distinct from the system display;

detecting a movement of a portion of the user's body along a first direction, the available items moving across the input display in response to the detected movement along the first direction;

detecting a movement of the portion of the user's body along a second direction; and selecting one of the displayed items based on the movement of the user's body along the second direction.

12. The method according to claim 11 wherein the selecting step includes the step of indicating an active position on the input display, the active position being the position of the selected item.

13. The method according to claim 12 further including the step of moving the active position from a first end to a second end of the input display.

* * * * *

UNITED STATES PATENT AND TRADEMARK OFFICE
CERTIFICATE OF CORRECTION

PATENT NO.   : 6,801,188 B2
DATED        : October 5, 2004
INVENTOR(S)  : Giuseppe Longobardi It is certified that error appears in the above-identified patent and that said Letters Patent is hereby corrected as shown below:

<u>Column 7,</u>
Line 46, please replace "detect" with -- detecting --.

Signed and Sealed this

Twenty-fifth Day of January, 2005

JON W. DUDAS
*Director of the United States Patent and Trademark Office*